Dec. 5, 1961  G. E. ROBERTS  3,011,250
WHEEL JACK

Filed June 5, 1959  2 Sheets-Sheet 1

INVENTOR.
GEORGE E. ROBERTS
BY

Dec. 5, 1961  G. E. ROBERTS  3,011,250
WHEEL JACK
Filed June 5, 1959  2 Sheets-Sheet 2

INVENTOR.
GEORGE E. ROBERTS
BY

3,011,250
WHEEL JACK
George E. Roberts, Martinsville, Mo.
Filed June 5, 1959, Ser. No. 818,428
1 Claim. (Cl. 29—267)

This invention relates to wheel pullers, used particularly for tractors and other farm equipment, and in particular a wheel puller or jack in which a large ring pivotally mounted on the end of a lever is placed around an axle and used as a fulcrum whereby two loops placed around bolt heads on a wheel on the axle draw the wheel along or from the axle.

This invention relates to tools for tractor wheel shifting and removal and more particularly it is an object of this invention to provide a more efficient tool for this purpose.

At the present time farmers are removing wheels by various crude methods such as crow-bars, wedges, jacks, and sledge hammers, with occasional breakage.

Wheels carrying water sometimes weigh as much as 1,000 pounds. The nuisance of shifting the wheels is sufficiently great that a substantial percentage of farmers leave the wheels at one spacing. For example, in plowing the plow cuts too much land when the land wheel is in the wrong place. When tractor-pulled combines are used unless the tractor wheels are in the right place a standing crop is run down and damaged.

An alfalfa crop has many leaves unnecessarily knocked off by piorly spaced wheels, the leaves being the best part of the feed.

The problem has not been entirely solved by the addition to the tractors of devices for shifting the wheel using tractor power.

While these power shift accessories have been an improvement for some farms, millions of farmers buy new tractors without the power wheel shift accessory because of its prohibitive extra cost. As a result there are millions of tractors, some relatively new and others old, which lack power wheel shifting.

There are times when wheels are frozen or rusted so as to be stuck. It can require as much as one-half day's work for a farmer to remove the two wheels.

An important object of my invention is to provide an inexpensive device which will solve the wheel shifting problem and which can be used for both the right and the left hand wheels.

A further object is to provide a wheel shifting device which can be engaged with the axle and put in to use in only a few seconds and by which maximum shifting of a wheel can be accomplished.

A still further object of the invention is to provide a wheel puller that grips around an axle and pulls a wheel on the axle by gripping bolt heads thereof in which the wheel puller is of a simple and economical construction.

With these and other objects and advantages in view the invention embodies a lever providing a handle extended from a traveler having side plates, and having a depending axle gripping ring, and extended bolt head gripping loops whereby with the axle gripping ring extended around an axle providing a fulcrum, and the loops positioned over bolt heads of a wheel on the axle the wheel may be worked along, and removed from the axle.

Other features and advantages of the invention will appear from the following description taken in connection with the drawings, wherein.

Figure 1:
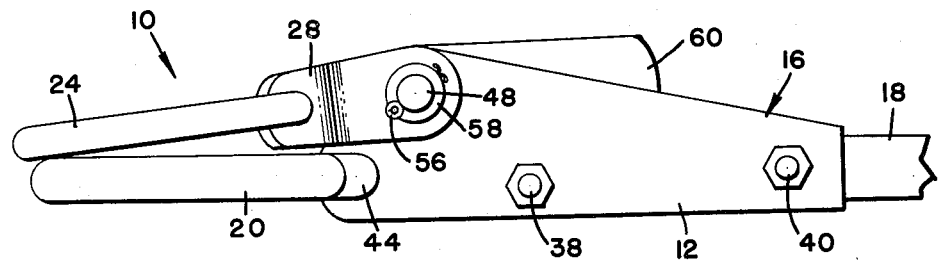
FIGURE 1 is a side elevational view of the improved wheel puller showing the traveler with the ring and one of the loops extended therefrom, and with the handle broken away.
Figure 2:
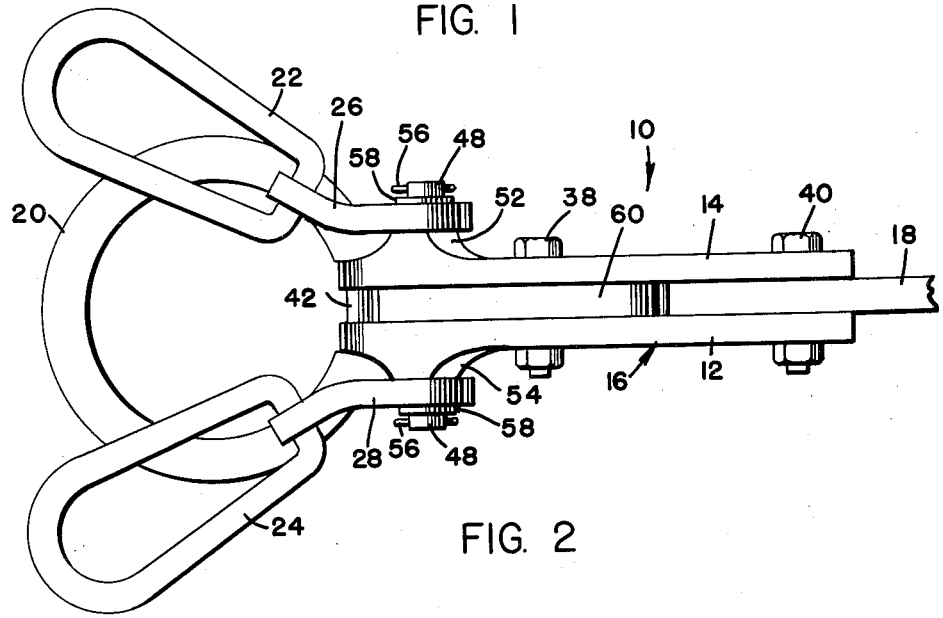
FIGURE 2 is a plan view of the wheel puller, also with the handle broken away.
Figure 3:
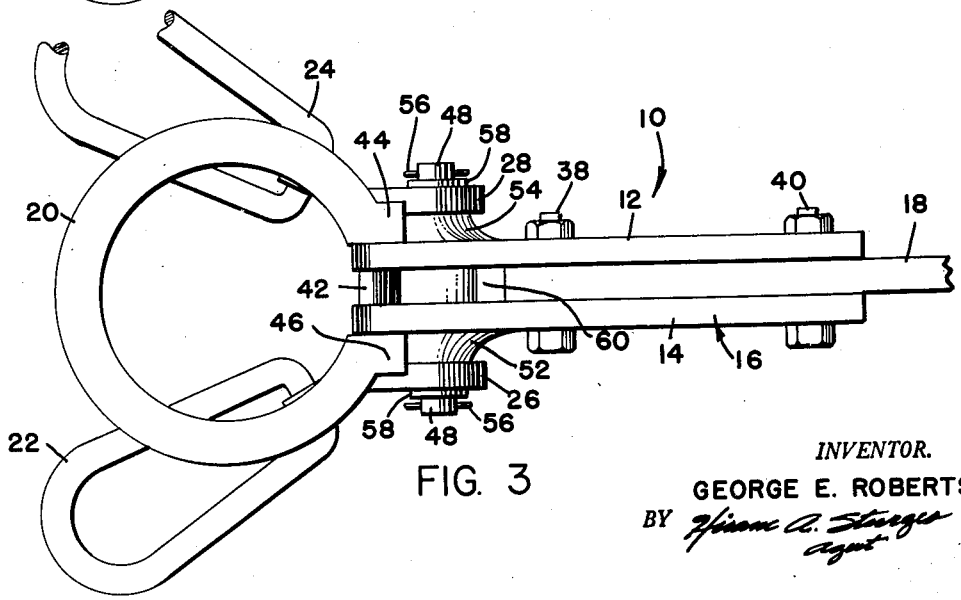
FIGURE 3 is a view looking upwardly toward the under surface of the traveler of the wheel puller.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10, refers to the invention in its entirety, numerals 12 and 14 indicating side plates of a traveler 16, numeral 18 indicating a handle, numeral 20 a split ring designed to be placed over an axle, and numerals 22 and 24 loops carried by arms 26 and 28, respectively, and positioned to be placed over the heads of bolts 30 of a hub 32 of a wheel 34 on an axle 36.

Figure 5:
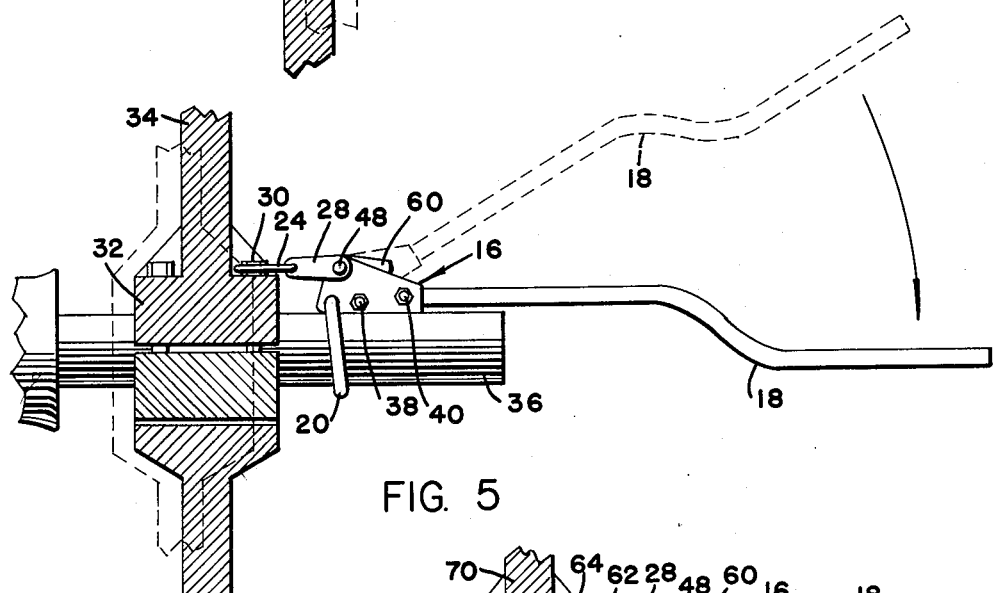
FIGURE 5 is a side elevational view illustrating the use of the puller for drawing a wheel along an axle, the wheel being shown in section.

The handle 18 is secured between the side plates by bolts 38 and 40, and the ring 20 is pivotally mounted in ends of the side plates by a pin 42 which extends through the side plates and into lugs 44 and 46 at the ends of the ring. The arms 26 and 28 are pivotally mounted on a pin 48 extended through bosses 52 and 54, respectively, and the arms are retained on the pin by cotter pins 56. Washers 58 are provided between the cotter pins and arms, In use the ring 20 is positioned over the axle 36 with the traveler 16 on the upper surface of the axle, as shown in FIGURE 5, and with the loops 22 and 24 positioned over the heads of bolts 30, the handle 18 is worked upwardly and downwardly between the position shown in full lines in FIGURE 5 and the position shown in dotted lines, whereby the hub of the wheel is drawn along the axle, such as from the position shown in dotted lines to the position shown in full lines.

Figure 4:
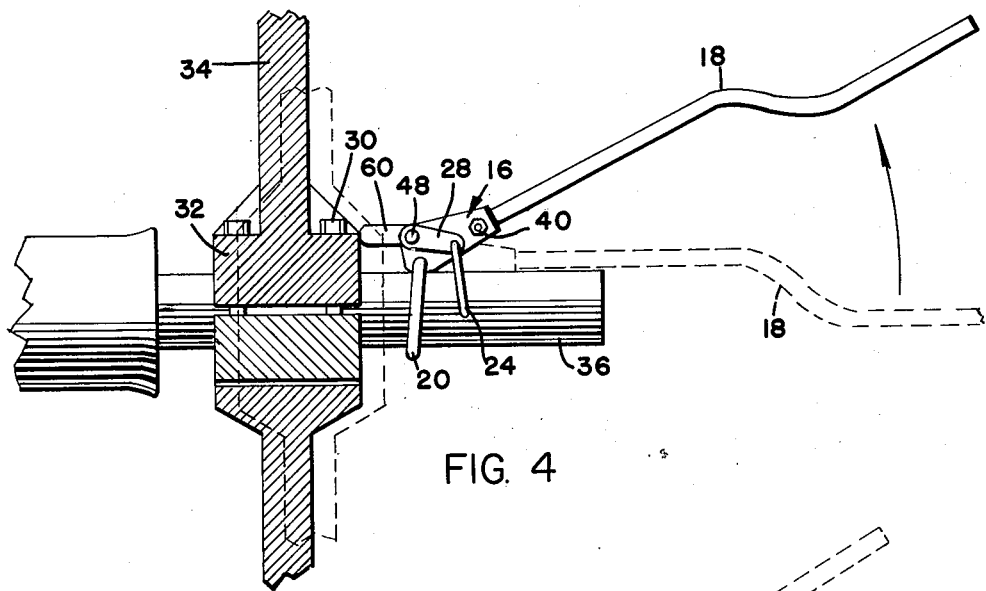
FIGURE 4 is a side elevational view of the wheel puller illustrating the use of the device in pushing a wheel on an axle, and in which the wheel is shown in section.

When it is desired to move the hub of the wheel in the opposite direction the loops 22 and 24 with the arms 26 and 28 are turned outwardly, as shown in FIGURE 4, and a bar 60, pivotally mounted on the pin 48 and between the side plates 12 and 14, is turned inwardly so that the end of the bar 60 engages the hub of the wheel. With the parts in this position working the handle upwardly and downwardly with the ring 20 as a fulcrum, forces the wheel back on the axle, such as from the position shown in dotted lines in FIGURE 4 to that shown in full lines.

Figure 6:
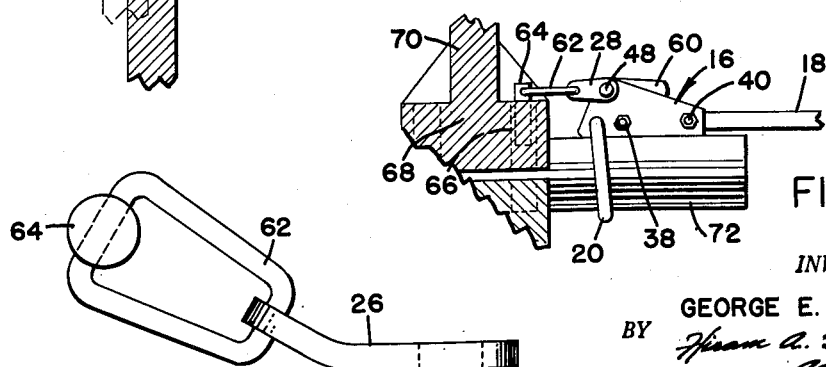
FIGURE 6 is a view similar to that shown in FIGURE 5 showing a modification wherein a stud is mounted on one of the loops and wherein the stud is positioned in a bolt hole of a hub of a wheel on the axle, parts of the wheel and axle being broken away.
Figure 7:
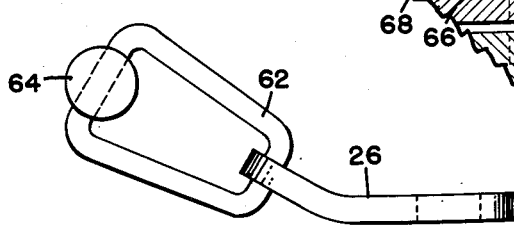
FIGURE 7 is a plan view of one of the loops and mounting arm thereof of the design shown in FIGURE 6.

In the design shown in FIGURES 6 and 7 loops 62, similar to the loops 22 and 24, are provided with square extended ends and plugs 64 are pivotally mounted on the said square ends. The plugs 64 are positioned to be inserted in bolt holes 66 of a hub 68 of a wheel 70 on an axle 72, and with the plugs in the bolt holes the wheel may be pulled in the manner described above.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

In a wheel shifter, the combination which comprises a pair of side plates, said side plates being in spaced parallel planes, a ring having an opening therein positioned with ends of the plates extended into said opening, means pivotally mounting the ring in the plates, said ring being positioned in a plane normal to the planes of the side plates and extended from ends of the side plates at one end of the shifter, arms pivotally mounted on outer surfaces of the side plates and positioned on the ends of the side plates in which the ring is mounted, said arms having diverging extended ends, loops pivotally mounted in the diverging ends of the arms, said loops being mounted to be positioned over heads of bolts of the hub of a wheel positioned on an axle around which the ring is positioned, and a handle mounted between said side plates and extended backwardly from the end of the shifter opposite to the end in which the ring is positioned, the axes of the pivotal mountings of the arms on the side plates being spaced above and forwardly of the pivotal mounting of the ring in said side plates with the handle in an elevated position, whereby with the ring extended around an axle and canted to provide an anchor downward movement of the handle with the loops positioned over heads of bolts of the hub of a wheel on the axle draws the hub and wheel longitudinally of the axle.

References Cited in the file of this patent

UNITED STATES PATENTS

| | | |
|---|---|---|
| 90,559 | Knott | May 25, 1869 |
| 1,261,164 | Quinlan | Apr. 2, 1918 |
| 1,494,564 | Piasecki | May 20, 1924 |
| 1,761,675 | Mick | June 3, 1930 |
| 2,424,115 | Powell | July 15, 1947 |
| 2,424,929 | Haney | July 29, 1947 |
| 2,710,520 | Selzler et al. | June 14, 1955 |
| 2,837,815 | Schumann | June 10, 1958 |